United States Patent [19]

Stauffer et al.

[11] 4,249,073
[45] Feb. 3, 1981

[54] METHOD AND APPARATUS FOR DETERMINING FOCUS POSITION

[75] Inventors: Norman L. Stauffer, Englewood; Dennis J. Wilwerding, Littleton, both of Colo.

[73] Assignee: Honeywell Inc., Minneapolis, Minn.

[21] Appl. No.: 16,595

[22] Filed: Mar. 1, 1979

[51] Int. Cl.³ .............................................. G01J 1/36
[52] U.S. Cl. .................................... 250/204; 354/25
[58] Field of Search ............. 250/201, 204, 208, 209; 354/25; 356/4

[56] References Cited

U.S. PATENT DOCUMENTS

| | | | |
|---|---|---|---|
| 3,945,023 | 3/1976 | Stauffer | 354/25 |
| 4,083,056 | 4/1978 | Nakamura et al. | 250/201 |
| 4,180,309 | 12/1979 | Miyata et al. | 354/25 |

Primary Examiner—David C. Nelms
Attorney, Agent, or Firm—Charles J. Ungemach

[57] ABSTRACT

A method and apparatus for determining the direction the taking lens of a camera should be moved in order to provide a proper focus condition. A plurality of radiant energy detectors are positioned to receive energy from a scene being viewed and a first group of such detectors produces a first output signal pattern while a second group of such detectors produces a second output signal pattern. The two patterns coincide at the desired focus position but move with respect to one another in a first or opposite direction depending upon the focus condition. The slope of one or both of the patterns at predetermined positions is multiplied by the difference in value from the outputs of the detectors to create values which are summed. The sign of the summed values is representative of the direction the taking lens must be moved to bring the patterns into coincidence at the desired focus position.

25 Claims, 6 Drawing Figures

METHOD AND APPARATUS FOR DETERMINING FOCUS POSITION

BACKGROUND OF THE INVENTION

In a copending application of Norman L. Stauffer, Ser. No. 912,688, filed June 5, 1978, now U.S. Pat. No. 4,185,191, issued Jan. 22, 1980, a range determination system is shown which is useable in a through-the-lens camera for positioning the taking lens at a desired correct focus position with respect to a remote object within the field of view. That system utilizes a plurality of small detectors such as charge coupled devices (CCD) or charge injection devices (CID) mounted in an array to receive radiation from the scene being viewed. The detectors are arranged in pairs with each pair being mounted behind a small lenslet so that each pair receives a view of the exit pupil of the taking lens but one of the detectors in each pair receives radiation primarily from a first portion of the taking lens while the other of the detectors in each pair receives radiation primarily from a different portion of the taking lens. The result is to create two similar curves indicative of the radiation distribution pattern from the scene being viewed. At a proper focus position, the two curves coincide but as the object changes position with respect to the camera, the two curves move with respect to each other to indicate an out-of-focus situation. The two curves move with respect to each other in a first direction when the object is closer to the camera than the desired focus position and move in an opposite direction with respect to each other as the object moves further from the camera than the desired focus position. By determining the direction of movement of the two curves with respect to each other, it is therefore possible to determine the direction that the taking lens has to be moved to achieve the desired focus position. The system disclosed in the above-mentioned copending application determines this direction but in cameras requiring highly accurate focusing, some errors may result because there is no way to detect focus errors between adjacent detector pairs. In other words, when a proper focus position lies between adjacent detector pairs, the system may stop short of the true focus position due to receiving a first direction indication when the patterns are on one side and an opposite direction indication when the patterns are on the other side. If, for example, the lenslets are spaced 0.2 millimeters apart and a 50 millimeter focal length f2 lens is used, this may result in a focus error of over 1 millimeter at the image plane which is acceptable for many applications but not for highly accurate focusing.

SUMMARY OF THE INVENTION

The apparatus and method of the present invention operates to determine the direction that two similar curves such as those produced by the detectors of the above-mentioned copending application need to be moved in order to produce coincidence thereof, but is capable of producing a focus which lies between detectors and this provides nearly exact auto focusing. This is accomplished in the present invention by obtaining a product which is related to the slope of the curves at predetermined points, multiplying these by the difference in value of the output of detectors at such points and summing this product over a predetermined range to produce a summation value. The summation value will be substantially zero when the two curves coincide, will have a negative sign when the two curves are displaced in a first direction and a positive sign when the two curves are displaced in the opposite direction.

DETAILED DESCRIPTION OF THE PREFERRED EMBODIMENTS

Figure 1:
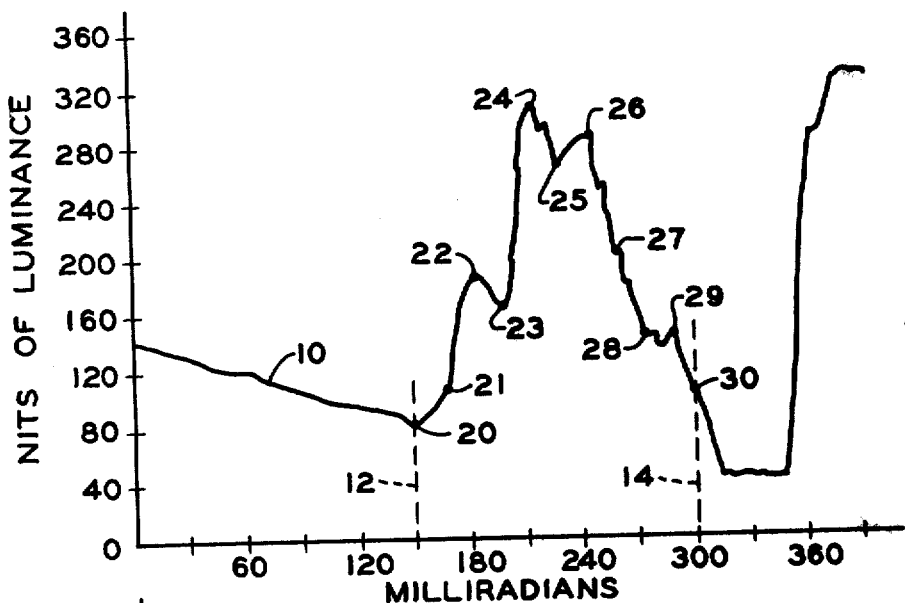
FIG. 1 shows a spatial distribution pattern as may be produced by the detectors at the proper focus position of a scene being viewed.

In FIG. 1, a curve 10 is shown representing the pattern of light intensity that might be produced by the the detectors of the above-mentioned copending application when the subject being viewed is in proper focus at the image plane of the taking lens. The lenslets in front of the detectors in the above-mentioned copending application are placed at the same distance from the taking lens of the camera as the film and receive at least a portion of the same light distribution pattern from the scene being viewed. The detectors in the array produce output signals in accordance with the radiation intensity they receive so as to produce the curve 10. The detector array might consist of a single row of detector pairs or may comprise several rows or some pattern such as parallel rows or crossed rows or other configurations. Rows of detectors might be mounted horizontally so as to recieve light along a horizontal portion of the pattern, vertically so as to receive light along a vertical portion of the pattern or diagonally so as to receive the light pattern as it exists along a diagonal of the scene being viewed. An advantageous arrangement is to mount one or more rows of detectors diagonally since normal repetitions of patterns in nature seldom occur in diagonal directions while vertically arranged scenes, such as picket fences or forests and horizontally arranged scenes such as sky lines and roadways, might produce some difficulty when detector arrays are mounted vertically or horizontally. The detectors may extend clear across the scene being viewed or, may be mounted to receive only a portion of the total distribution pattern available.

In FIG. 1, the ordinate of curve 10 is shown as luminance and the curve is seen to extend from a low of about 40 nits to a high of about 360 nits while the abscissa is in milliradians across the image being viewed and the curve is seen to extend from 0 to approximately 375 milliradians. The amount of luminance will, of course, vary with the lighting and composition of the scene being viewed and the size of the scene image at the image plane will vary with the focal length of the lens. In FIG. 1, the luminance is that equivalent to a normally lighted room and the extent of the curve is approximately one half of the angular field of a 50 millimeter focal length lens.

In FIG. 1, two dashed lines 12 and 14 are shown extending vertically from about 150 milliradians and about 300 milliradians respectively. For simplicity in the following analysis, it will be assumed that the detector array receives the pattern of FIG. 10 in this area from 150 milliradians to 300 milliradians and, also for simplicity, it will be assumed that there are 11 detector pairs between these two points. In actual practice, the number of detector elements would more likely be approximately 32 pairs of detectors which would be mounted in an array approximately five millimeters in length which, with a 50 millimeter lens, would extend approximately 100 milliradians across the distribution pattern.

In FIG. 1, it will be assumed that the 11 detector pairs are equally spaced and produce output signals at points along curve 10 identified by reference numerals 20, 21, 22, 23, 24, 25, 26, 27, 28, 29 and 30 which output signals correspond in magnitude to the amount of radiation they receive. It is seen in FIG. 1 that the luminance at point 20 is approximately 80 nits, that at point 21 approximately 100 nits, that at point 22 approximately 180 nits, that at point 23 approximately 160 nits, that at point 24 approximately 300 nits, that at point 25 approximately 260 nits, that at point 26 approximately 280 nits, that at point 27 approximately 200 nits, that at point 28 approximately 140 nits, that at point 29 approximately 140 nits and that at point 30 approximately 100 nits. In FIG. 1, the situation is as it would exist when the taking lens is in focus so that both of the detectors in each of the pairs are receiving the same amount of radiation and produce the same magnitude output signal.

Figure 2:
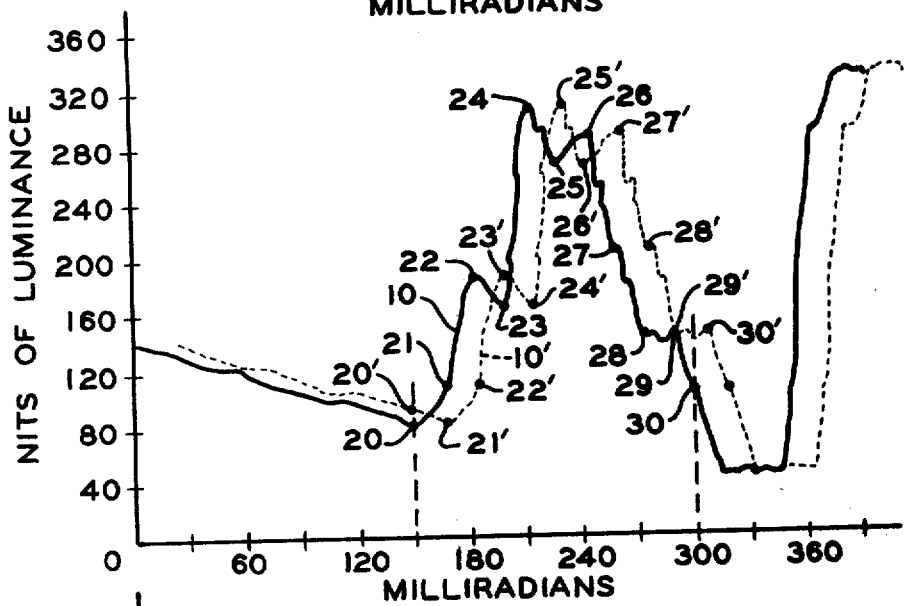
FIG. 2 shows two patterns like FIG. 1, one of which is displaced from the other to show an out-of-focus condition in a first direction.

FIG. 2 shows the pattern of FIG. 1 as it might exist when the object is further away from the taking lens than was the case in FIG. 1. Curve 10 is shown in the same position as it was in FIG. 1 and represents the distribution pattern that is sensed by the first of the pairs of detectors in the array. A similar curve identified by reference numeral 10' is shown to the right of curve 10 and represents the distribution pattern that is sensed by the other of the detectors in each pair. As was the case in FIG. 1, the first of the pairs of the detectors produces output signals of magnitudes shown at points 20-30 but the other of the detectors in each pair produces output signals of magnitudes shown at points 20'-30'. Thus, while the first of detectors in the first pair still receives approximately the same radiation, the second of the detectors in the first pair receives radiation as shown by point 20' and, as seen, this luminance differs by about 10 nits, that is, the output at 20' is approximately 90 nits while the output at point 20 is still approximately 80 nits. In similar fashion, the luminance received by the detector producing the output at point 21 will still be approximately 100 nits but the luminance received by the other of that causes an output at point 21' which is approximately 80 nits. This continues throughout the distribution pattern with one curve being higher or lower than the other in most cases although occasionally, such as at points 29 and 29', where the amount of radiation received by both detectors in the pair is approximately the same.

Figure 3:
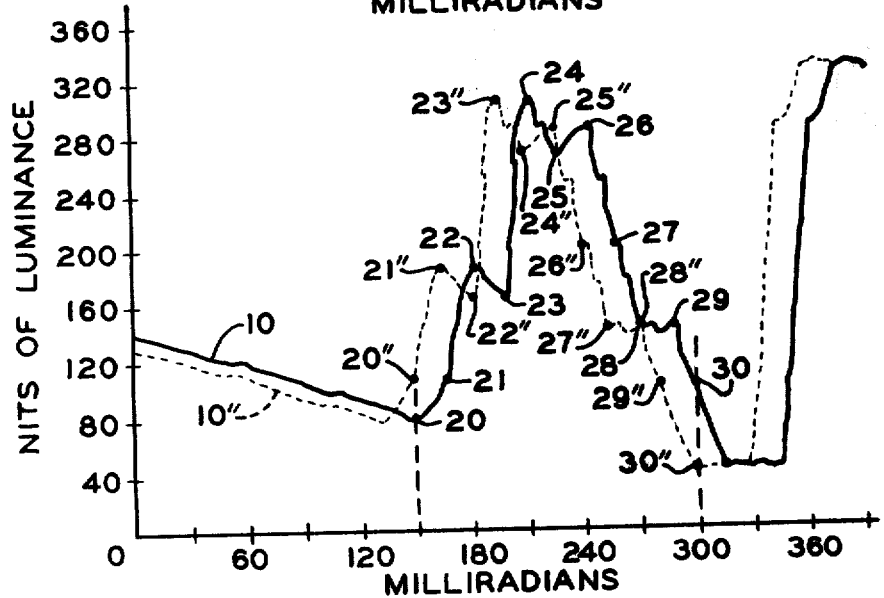
FIG. 3 shows two patterns like that of FIG. 1 with one of the curves displaced from the other to show an out-of-focus condition in a direction opposite to that of FIG. 2.

In FIG. 3, the distribution pattern of FIG. 1 is again shown as curve 10 but a second distribution pattern, identified by reference numeral 10", is now shown shifted to the left from curve 10 as would be the case if the object to be focused upon moved closer to the lens than was the case in FIG. 1. In FIG. 3, the amount of luminance received by the detectors at points 20-30 is the same as it was in FIG. 1 but the radiation received by the other of the detectors in each pair has shifted so that at point 20" the detector is producing an output indicating approximately 100 nits of luminance which is about 20 nits more than that received by the detector producing the output at point 20. As with FIG. 2, the difference in radiation received by each of the pairs throughout the distribution pattern is generally different although occasionally, such as at point 28 and 28" in FIG. 3, the detectors are receiving approximately the same radiation.

In FIG. 2, if the object were to move further and further away from the lens, curve 10' would move further and further to the right with respect to curve 10 and the difference in radiation received by the pairs of detectors in each set would change as this occurred. In FIG. 3, if the object were to move closer and closer to the lens, the curve 10" would move further to the left with respect to curve 10 and again the radiation received by the detectors in each pair would change as this occurred. It should also be noticed that curve 10' in FIG. 2 has moved approximately 20 milliradians to the right of curve 10 while in FIG. 3, curve 10" has moved approximately 20 milliradians to the left of curve 10 so that the difference in outputs of detectors located at points 20 and 20" should be the same as the difference in outputs between detectors at 21 and 21' in FIG. 2 but in opposite sense. In other words, the difference between the value at point 21 and point 21' in FIG. 2 is a positive 20 nits whereas the difference between points 20 and 20" in FIG. 3 is approximately a negative 20 nits. The positive differences which occur in FIG. 2 between curves 10 and 10' continue to be generally positive until at about 220 milliradians where the peak is reached at which time the difference between curve 10 and curve 10' starts becoming negative. Likewise in FIG. 3, the negative values of the difference between curve 10 and curve 10" continue to exist until at about 210 milliradians where the peak is reached and thereafter the difference between curves 10 and 10' generally become positive. It should also be noticed that the slope of the curve is generally positive in both FIGS. 2 and 3 from approximately 150 milliradians to the peak and is thereafter generally negative up through the 300 milliradian limit. It is the fact that the slope of the curves changes from positive to negative at about the point where the differences between curves 10 and either 10' or 10" reverse in sign that provides a means for determining whether or not the pattern has moved to the right or to the left of curve 10 so as to determine which way to position the taking lens of the camera for a proper focus. For example, in FIG. 2, if the slope which is generally positive from about 150 milliradians to about 220 milliradians is multiplied by the difference between the outputs of the detectors at the various points 20-25, the net result will generally be positive since the positive slope is being multiplied by a positive difference in most cases. Likewise, from about 220 milliradians through 300 milliradians in FIG. 2, the slope is generally negative but the difference between curves 10 and 10' is also generally negative so that in aggregate throughout the entire curve the product of the slope and the differences in outputs will be generally positive in FIG. 2. On the other hand, in FIG. 3 where between 150 milliradians and approximately 210 milliradians, the slope is generally positive, the difference between curves 10 and 10'' is generally negative so that the product is generally negative. In similar fashion, from the peak at about 210 milliradians through the remaining portion of the curve at 300 milliradians, the slope is generally negative but the difference between the outputs of the detectors is generally positive and the product is again generally negative. It is seen that throughout the entire pattern of FIG. 3, the product of slope times difference will be generally negative while in FIG. 2 the product is generally positive.

If the object were to move further away from the focus position than is the case in FIG. 2, curve 10' would move further to the right but again the slope up through the middle point would be generally positive while the differences between values at the various points along the curves would also be generally positive and after the peak, where the slope is generally negative, the difference between the points on the curve would continue to be generally negative. Likewise, in FIG. 3, if the object were to move yet closer to the camera, curve 10'' would continue to move generally to the left but again the slope up to where the peak exists would generally be positive while the difference between values sensed along curves 10 and 10'' would generally be negative and after the peak, where the slope is generally negative, the differences would continue to be positive.

Thus, by providing means for sensing the slope of the distribution patterns for the sensing devices and providing means to sense the difference in values at points along the curves generated by these sensors and further providing means for multiplying and summing these values, a means for determining the direction necessary to move the taking lens is obtained. More specifically, whenever the product of a function of curve slope and a function of the differences that exist between detectors is of a first sign (for example, positive in FIG. 2), the taking lens will have to be moved away from the camera and towards the object in order to bring the curves back into coincidence, but whenever product of the function of slope and a function of the difference is of the opposite sign (for example, negative in FIG. 3), then the taking lens will have to be moved more towards the camera and away from the object to obtain a proper focus condition.

One convenient way of obtaining a value which is a function of the slope of the curve, is to subtract the values sensed by adjacent detectors. For example, in FIG. 2, if one subtracts the output value at point 20 from the output value at point 21 along curve 10, a negative value will result and similarly, if the output of the detector at point 22 is subtracted from the output of the detector at point 21, a negative value will occur. This will generally hold true for positive slopes as from points 20 through 24 along curve 10 although occasionally, as between points 22 and 23, a positive value may result indicative of a minor negative slope. Even though there may be exceptions, particularly where there is a lot of high frequency components in the signal, the general trend or low frequency component will be positive from points 20 to 24 and the summation of the differences of adjacent points from point 20 through 24, will, therefore, generally be positive. Likewise, from points 24 through 30, the subtraction of adjacent points will result in a positive value thus indicating a negative slope although occasionally, as for example between points 25 and 26, a negative value will occur. Nevertheless, the differences between adjacent points from point 24 through point 30 will generally be positive in accordance with the low frequency component of the signal and the summation will also be positive. Thus, the summation of the differences between adjacent points from point 20 to 24, being negative, will show a generally positive slope to exist while the summation of the differences between adjacent points from point 24 through 30, being positive will be generally indicative of the negative slope of the low frequency component. Accordingly, when the differences above-described between adjacent points along the curves are multiplied by the differences that exist between the outputs of pairs of detectors at the same point, a generally negative result will occur in FIG. 2 between points 20 and 24 because a negative value, representative of a positive slope, will be multiplied by a positive value representative of difference. Likewise, from points 24 through points 30, the product will again be negative because the positive value, representative of the negative slope, will be multiplied by generally negative differences. In FIG. 3, the opposite condition will occur and generally positive figures will result when the difference between adjacent detector outputs is multiplied by the difference between outputs in a pair throughout the curve. If the symbol a is used to represent the output of the first of the detectors in each pair and if the symbol b is used to represent the output of the second of the detectors in each pair, and if there are detectors in each array then it is seen that $a_n - b_n$, multiplied by $a_n - a_{n+1}$ (where n represents the number of the detector pair used) will provide the product discussed above and this product will generally be negative throughout the curve of FIG. 2 and generally be positive throughout the curve of FIG. 3. Accordingly, to determine which direction the lens must be moved for achieving proper focus, the sign of the expression $$\sum_{1}^{m-1} (a_n - b_n) \cdot (a_n - a_{n+1}) \tag{1}$$

need only be determined.

While above equation presents perfectly satisfactory for use in determining the direction the lens must be moved, greater accuracy is obtainable when the slope of both of the curves is taken into account. Looking at the slope of both of the curves can be obtained in similar manner by adding the difference in adjacent detector outputs along one curve to the difference between adjacent detector outputs along the other curve so that the signal representative of the slope of both curves is given by the expression $a_n - a_{n+1} + b_n - b_{n+1}$. In similar fashion, greater accuracy is obtainable if one looks not only at the difference in one pair of detectors but rather at the difference in the outputs of two pairs of detectors simultaneously. For example, instead of merely looking at $a_n - b_n$ in each instance, one may conveniently look at the expression $a_n - b_n + a_{n+1} - b_{n+1}$ to obtain the difference signal. Under these circumstances, the total expression whose sign will be indicative of the direction the lens must be moved for proper focus will be given by $$\sum_{1}^{m-1} (a_n - b_n + a_{n+1} - b_{n+1}) \cdot (a_n - a_{n+1} + b_n - b_{n+1}) \tag{2}$$

In the above expression, the first term is indicative of the difference between points along the curves while the second term is indicative of the slope of the two curves. In a manner similar to that described above, the differences will be generally positive in FIG. 2 from point 20 through point 24 while the slope factor will be generally negative and from points 24 through 30 in FIG. 2, the difference factor will be generally negative while the slope factor will be generally positive so that the next summation will be generally negative for FIG. 2. In FIG. 3, the difference factor and the slope factor will both be generally negative between points 20 and 24 and both will be generally positive between points 24 and 30 to give a generally positive summation result.

Figure 4:
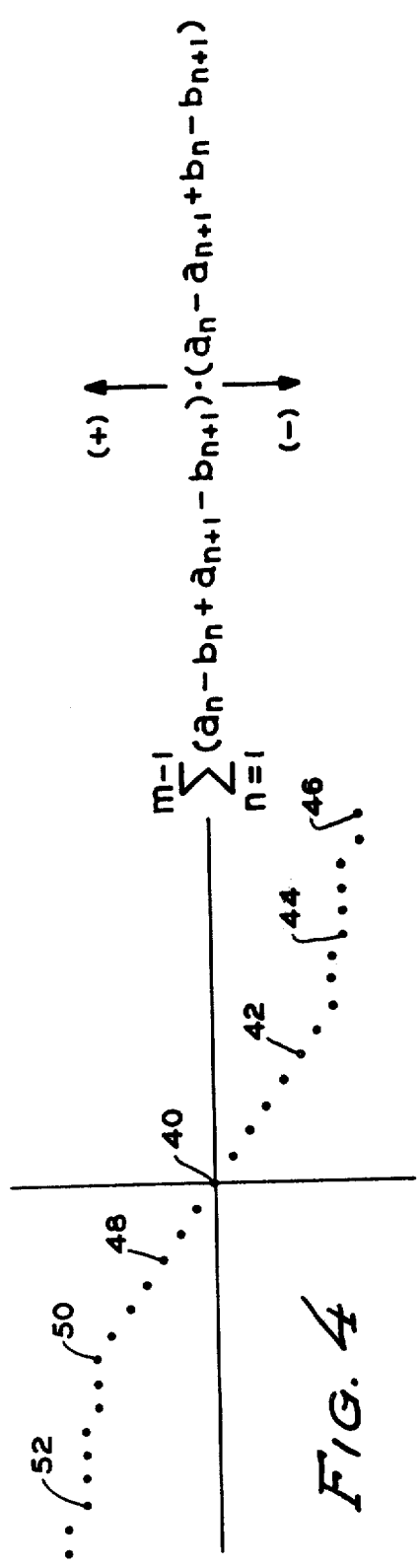
FIG. 4 shows a graph with points thereon representing various summations of the slope related function times the difference related function for various focus conditions.

FIG. 4 shows a graph of values that might be obtained for the summation given in equations 1 or 2 above as the object moves away from the focus position in both directions. The ordinant represents values obtained by the summation as is shown, for example, by equation 2 at the right hand side of FIG. 4 while the abscissa represents the displacement of the two patterns from coincidence and thus of the out-of-focus extent. Point 40 in FIG. 4 shows that the summation is zero when the displacement of the two patterns is as shown in FIG. 1 which is the "in focus" condition. The value of the summation becomes generally more negative as shown by points 42, 44, and 46, for example, as the object to be focused on moves further and further from the camera as in FIG. 2. As the object moves closer and closer to the camera, as in FIG. 3, the value of the summation becomes generally more positive with further and further displacements from proper focus as is shown generally by points 48, 50 and 52. With certain repetitive patterns, the value of the sum may again decrease towards the zero axis with greater displacements from focus but in nearly all cases, this only occurs when the displacement is quite large. In a rare case, at very large displacements, the summation could actually change signs to produce an erroneous output but this is, as indicated, a rare situation involving very unusual repetitive patterns containing mostly high frequency components and having nearly no low frequency components.

Accordingly, it is seen that by detecting the sign of the summation shown in equations 1 or 2, a signal may be created which can be used to direct the positioning of the taking lens of the camera towards the desired focus position.

Figure 5:
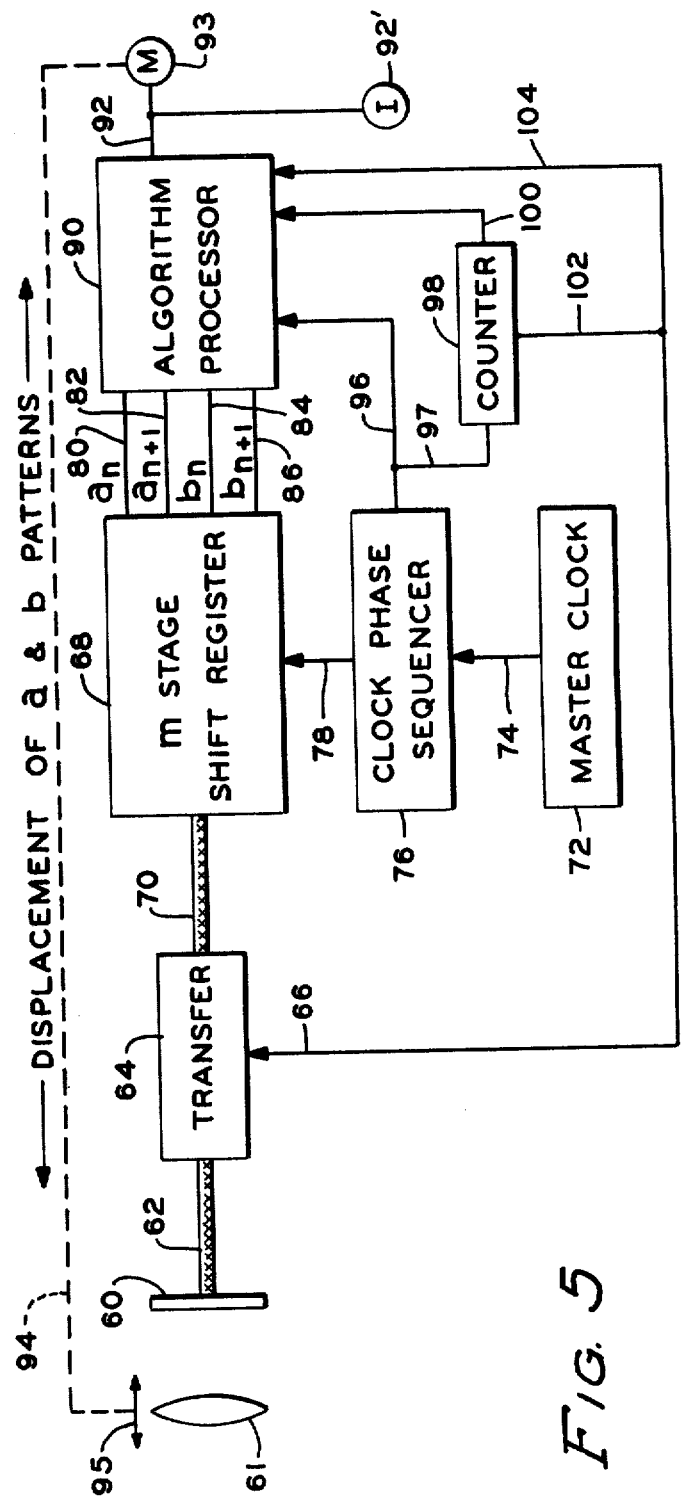
FIG. 5 shows a block diagram of circuitry for the determination of direction of displacement of one pattern with respect to the other.

FIG. 5 shows a block diagram of a circuit which can extract the values for $a_n$, $a_{n+1}$, etc. and $b_n$, $b_{n+1}$, etc. so as to create the desired summation signal for driving the taking lens of a camera. In FIG. 5, the detector array is identified by reference numeral 60 and is shown mounted to the right of a moveable lens 61 which may be the taking lens of the camera. Array 60 may be like that shown in the above-referred to copending application and the outputs of the individual detectors are presented by transfer means such as cable 62 to a transfer device 64. Transfer device 64 may merely be a switch which operates upon the receipt of a signal on a line 66 to transfer the various outputs of the detectors on line 62 to an m stage register 68 by further transfer such as means of a cable 70.

A master clock 72 produces a clock output signal on a line 74 to a clock phase sequencer 76 which produces a three phase pulse signal on a line 78 to the shift register 68. The signals on cables 62 and 70, indicative of the amount of radiation received by each of the detectors in the array 60, are stored in the shift register 68 and upon the occurrence of a first clock phase pulse from the clock phase sequencer 76, four signals identified as $a_n$, $a_{n+1}$, $b_n$ and $b_{n+1}$ will appear on lines 80, 82, 84 and 86 respectively. As will be later described, these signals are in proper order with the "a" signals appearing on lines 80 and 82 and the "b" signals appearing on lines 84 and 86. The pulses from the clock phase sequencer 76 that causes signals to appear in this proper order, will be herein referred to as valid data pulses. After the first valid data pulse, the next clock phase pulse from sequencer 76 will cause the m stage shift register 68 to produce an output on line 80 indicative of $b_n$, that on line 82 of $b_{n+1}$, that on line 84 of $a_{n+1}$, and that on line 86 to be $a_{n+1}$. Since these signals are in different order; i.e., the "a" signals appear on lines 84 and 86 while the "b" signals appear on lines 80 and 82, the information is not useful and the pulse from the clock phase sequencer 76 causing this to occur, is not a valid data pulse. On the third pulse from the clock phase sequencer 76, the output on line 80 becomes $a_{n+1}$, that on line 82 $a_{n+2}$, that on line 84 $b_{n+1}$ and that on line 86 $b_{n+2}$ which again is in the proper sequence so that the pulse from the clock phase sequencer 76 causing this output is again a valid data pulse. It is seen that every other pulse from the clock phase sequencer 76 on line 78 produces a valid data pulse or, in other words, one where line 80 contains an "a" term, line 82 contains an "a" term increased by 1, line 84 contains a "b" term and line 86 contains a "b" term increased by 1. As will be seen in connection with the description of FIG. 6, only the valid data pulses are used to determine the slope and difference figures required. The process continues for one complete cycle until line 80 carries the signal from one of the pair of detectors in the next-to-last or m−1 of the detector pairs, line 82 contains the signal from one of the pair of detectors in the last or n of the detector pairs, line 84 carries the signal from the other of the pair of detectors in the next-to-last or m−1 of the detector pairs and line 86 carries the signal from the other of the pair of detectors in the last or m of the detector pairs. Accordingly, if there are 11 detectors, as is used in the present example, there will be 10 valid data pulse signals on line 78 causing 10 proper signals to appear on lines 80–86. Lines 80–86 are shown in FIG. 5 to be connected to an algorithm processor 90 which operates, as will be described in connection with FIG. 6, to produce an output on line 92 indicative of the sign of equation 2 above. The output on line 92 may be used to actuate an indicator 92' to show the direction the lens 61 must be moved to achieve proper focus or, as also shown in FIG. 5, to drive a reversible motor 93 which, by means of a mechanical connection shown as dashed line 94, automatically moves lens 61 in the direction of arrows 95 to the proper focus position.

Valid data pulses, that is, every other pulse from the clock phase sequencer 76, are also presented on a line 96 to the algorithm processor 90 and via a line 97 to counter 98 which counts the valid data pulses and produces an output pulse on line 100 after m−1 valid data pulses have occurred. Thus, in the example given with 11 detectors, there will be 10 valid data pulses for each cycle of operation and upon the completion of the tenth valid data pulse, the counter 98 will produce an m−1 pulse on line 100 which is shown connected to the algorithm processor 90 for purposes to be explained in connection with FIG. 6. Upon the occurrence of what would be the next valid data pulse or in the example given, the 11th valid data pulse, the counter 98 will produce an m signal on a line 102 indicative of the fact that all of the contents of the shift register 68 have been presented to the algorithm processor 90 and the cycle is now complete. This m signal on line 102 is presented to the algorithm processor 90 via a line 104 for purposes to be explained in connection with FIG. 6 and also via line 66 to the transfer switch 64 so that upon completion of the cycle, the signals on the individual detectors of array 60 may again be transferred into the m stage shift register 68 for use in the next cycle of operation.

Figure 6:
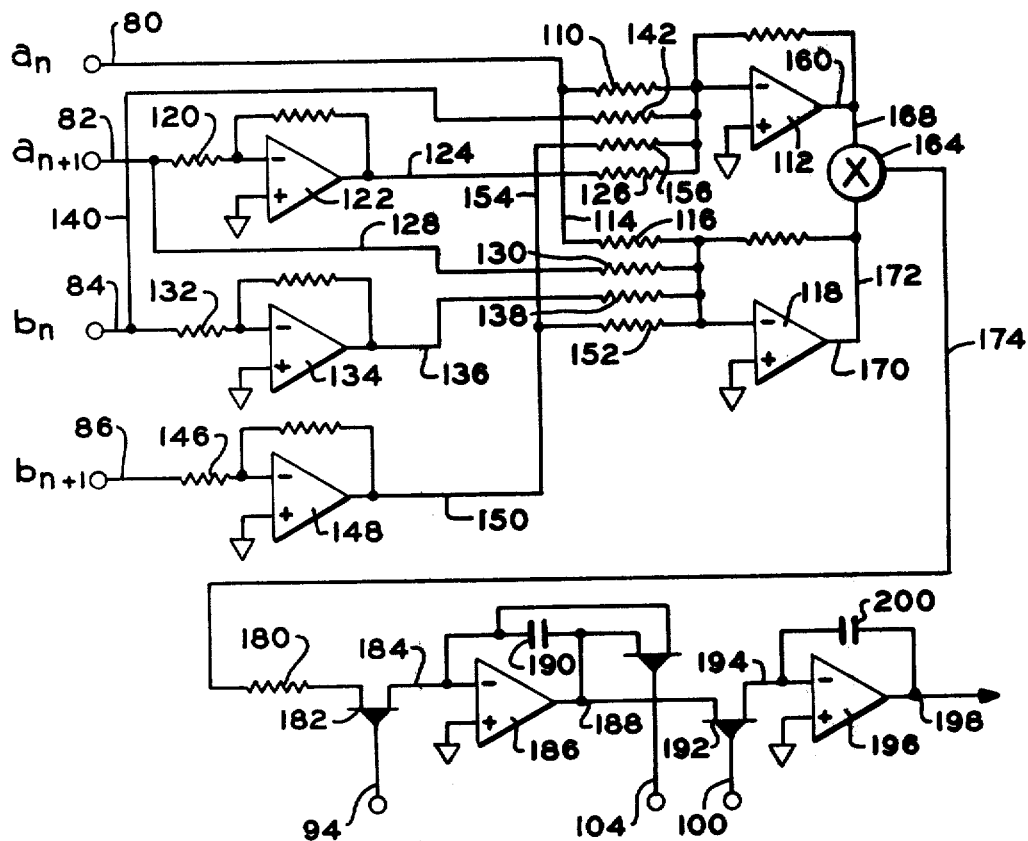
FIG. 6 shows a schematic diagram of the algorithm processor of FIG. 5.

In FIG. 6, a schematic diagram of the algorithm processor 90 is shown and the various lines leading to the algorithm processor in FIG. 5 bear the same reference numerals in FIG. 6. As shown in FIG. 6, the $a_n$ line from the shift register 68 appears on a line 80 where it is fed through a resistor 110 to the negative input of an operational amplifier 112. The signal on line 80, indicative of $a_n$, is also presented via a line 114 and a resistor 116 to the negative input terminal of a second operational amplifier 118. Operational amplifiers 112 and 118 are connected so that they sum the inputs that they receive at their negative terminal to produce an output indicative of such sum.

The $a_{n+1}$ signal, appearing on line 82, is presented through a resistor 120 to the negative input terminal of an operational amplifier 122 which is connected to act as a sign reverser or inverter so that its output which appears on a line 124 will be of magnitude equal to the signal $a_{n+1}$ but of opposite sign. Line 124 is connected via a resistor 126 to the negative input of operational amplifier 112. The signal on line 82, indicative of the signal from the $a_{n+1}$ detector, is also presented via a line 128 and a resistor 130 to the negative input of operational amplifier 118.

The $b_n$ signal on line 84 is connected via a resistor 132 to the negative input terminal of an operational amplifier 134 which, like operational amplifier 122, acts as a sign reverser or inverter so that its output signal which appears on line 136 is equal in magnitude but opposite in sign to that of $b_n$ on line 84. This signal on line 136 is presented via resistor 138 to the negative input terminal of operational amplifier 118. The signal on line 84 is also connected via a line 140 and a resistor 142 to the negative input terminal of operational amplifier 112.

The $b_{n+1}$ signal on line 86 is fed via a resistor 146 to the negative input terminal of an operational amplifier 148. Operational amplifier 148, like operational amplifiers 122 and 134, is connected so as to act as a sign reverser or inverter so that its output which appears on a line 150 is indicative of the magnitude of the signal $b_{n+1}$ but of opposite sign. This signal is presented by way of a resistor 152 to the negative input terminal of operational amplifier 118 and by a line 154 and a resistor 156 to the negative input terminal of operational amplifier 112.

It is seen that the operational amplifier 112 receives four input signals at its negative terminal, the first indicative of $a_n$, the second indicative of $-a_{n+1}$, the third indicative of $b_n$ and the fourth indicative of $-b_{n+1}$. Accordingly, the output of operational amplifier 112 on line 160 is indicative of the expression $a_n - a_{n+1} + b_n - b_{n+1}$ and this signal is fed to a multiplier 164 by way of a line 168.

It is also seen that the operational amplifier 118 receives four input signals, the first being indicative of $a_n$, the second being indicative of $a_{n+1}$, the third being indicative of $-b_n$ and the fourth being indicative of $-b_{n+1}$ so that the output of operational amplifier 118 on a line 170 is indicative of the expression $a_n - b_n + a_{n+1} - b_{n+1}$. This signal is presented to the multiplier 164 by way of a line 172. Multiplier 164 will multiply the signals on lines 168 and 172 to produce an output on a line 174 indicative of the expression $(a_n - b_n + a_{n+1} - b_{n+1}) \cdot (a_n - a_{n+1} + b_n - b_{n+1})$ which is, of course, the expression of equation 2 to be summed.

The signal on line 174 is presented through a resistor 180 to a switch 182, the other side of which is connected via a line 184 to the negative input terminal of an operational amplifier 186. Switch 182 is shown having an input line 94 which, as shown in FIG. 5, carries the valid data pulse signals produced by the clock phase sequencer 76. Each time a valid data pulse is received on line 94, switch 182 operates to transfer the signal on line 174 to the negative input terminal of operational amplifier 186 and by this means only the signals presented to the algorithm processor 90, carrying valid data, that is the signals indicative of the $a_n$, $a_{n+1}$, $b_n$ and $b_{n+1}$ in the proper order, are used.

Operational amplifier 186 produces an output on line 188 and a capacitor 190 is connected between line 188 and the input line 184 so that operational amplifier 186 operates as an integrator. The signal on line 188 will therefore be the negative summation of the signals on line 174 and thus will be indicative of the desired summation of equation 2 above. This signal on line 188 is presented by means of a switch 192 and a line 194 to the negative input terminal of an operational amplifier 196 which produces an output on line 198. A capacitor 200 is connected between the output 198 and the input 194 and since there is no resistor at the input of operational amplifier 196, the output will go to a negative or positive saturation potential depending on the sign of the signal at its input on line 194. The signal on line 194 will be present only when switch 192 is in an "on" condition and this occurs when a pulse appears on line 100 which, as seen in FIG. 5, is from the m stage divider 98 and is indicative of the count having completed $n-1$ valid data pulses. Switch 192, therefore, is turned on at the conclusion of the summation of all of the signals which exist on line 174 and the sign of this signal controls the sign of the pulse that will appear on line 198 at the output of operational amplifier 196. Thus, after $m-1$ operations of the circuit, switch 192 will close and the summed output from operational amplifier 186 indicative of the sum of all of the signals which were presented to it during the cycle will appear on 194 and will be either positive or negative. If positive, a negative potential will appear on line 198 and if negative, a positive potential will appear on line 198. The signal on line 198 may then be fed to a conventional motor control circuit to operate motor 93 of FIG. 5 and thus move in a first or opposite direction according to the sign of the signal on line 198 so as to obtain the proper focus position.

It should be noticed that the signal on line 198 will be positive or negative until an exact coincidence has occurred and that this does not depend on the spacing between detector pairs. The positive or negative summation of equations 1 or 2 exist on either side of point 40 in FIG. 4 so that the lens will be driven to the proper position and the difficulty encountered in the prior system is thus overcome.

It is thus seen that I have provided a method and apparatus for producing a signal operable to move the taking lens of a camera or other optical system to a desired focus position. It is also seen that so long as there exists either a positive or negative signal on line 194 at the conclusion of a cycle, the taking lens will be driven towards the focus position and accordingly, extreme accuracy in positioning the taking lens is possible. Many obvious alterations and changes to the circuitry described in connection with the preferred embodiment will occur to those skilled in the art. For example, although we have specifically described a circuit for solving the equation $$\sum_{n=1}^{m-1} (a_n - b_n + a_{n+1} - b_{n+1}) \cdot (a_n - a_{n+1} + b_n - b_{n+1}), \quad (2)$$

circuitry for solving the equation $$\sum_{n=1}^{m-1} (a_n - b_n) \cdot (a_n - b_{n+1}) \quad (1)$$

may be easily designed so as to produce the same effect. Other functions may also be used wherein some factor that is related to the slope of the intensity distribution patterns is multiplied by the difference in intensity at various points along the patterns to produce a signal whose sign is indicative of the direction necessary for the taking lens to be moved to achieve proper focus. It is also seen that in the specific circuitry described in connection with FIGS. 5 and 6, the various clocks, inverters, integrators and summing circuits may have other logic equivalents in the art. While the system has been described in connection with a through the lens focus system, the same principles may be employed in an auto focus camera using two different paths for light to be conducted from the subject to two separated detector arrays such as is found in Stauffer U.S. Pat. No. 4,002,899 issued Jan. 11, 1977. Accordingly, I do not wish to be limited by the specific showings used in connection with the preferred embodiments described herein but rather intend only to be limited by the scope of the following claims.

The embodiments of the invention in which an exclusive property or right is claimed are defined as follows:

1. Apparatus for use with an auto focus system which includes lens means that produces first and second radiation patterns of a scene, and first radiation detector means responsive to the first radiation pattern to produce a first output signal in accordance therewith and second radiation detector means responsive to the second radiation pattern to produce a second output signal in accordance therewith, said first and second output signals being similar and in a first position with respect to each other when the lens means is at a proper focus position, the first and second output signals moving away from the first position in a first direction when the lens means moves away from the proper focus position on a first side, the first and second output signals moving away from the first position in a second direction opposite to the first direction when the lens means moves away from the proper focus position on a second side opposite to the first side, the improvement comprising:

means detecting the slope of a portion of at least one of the first and second output signals and producing a first resultant signal in accordance therewith;
means detecting the difference in magnitude of the first and second output signals and producing a second resultant signal in accordance therewith; and further means receiving the first resultant signal and the second resultant signal to produce a product signal which has a first sign when the first and second output signals are away from the first position in the first direction and which has a second sign when the first and second output signals are away from the first position in the second direction.

2. Apparatus according to claim 1 wherein each of said first and second output signals are curves having a plurality of positions thereon and the means detecting the slope comprises subtracting means subtracting the magnitude of at least one of the first and second output signals at a first position from the magnitude of the one of the first and second output signals at a second position adjacent the first position.

3. Apparatus according to claim 2 wherein the means detecting the difference comprises subtracting means subtracting the magnitude of the first output signal at the first position from the magnitude of the second output signal at a first position.

4. Apparatus according to claim 1 wherein each of said first and second output signals are curves having a plurality of positions thereon and wherein the means detecting the slope comprises subtracting means subtracting the magnitude of both the first and second output signals at a first position from the magnitude of both the first and second output signals at a second position adjacent the first position.

5. Apparatus according to claim 4 wherein the means detecting the difference comprises subtracting means subtracting the magnitude of the first and second output signals at both the first and second positions.

6. Apparatus according to claim 1 including summing means connected to receive the product signal and to produce a sum signal indicative of the sum of the product signals.

7. Apparatus according to claim 6 including means connected to said summing means and said lens means and operable in accordance with the sum signal to move said lens means toward a proper focus position.

8. Apparatus for use with an optical system which includes lens means for focusing radiation from a scene, the lens means producing first and second substantially identical radiation patterns of the scene and first and second radiation detector means, the first detector means receiving the first radiation pattern and producing a first output signal having a first waveform, the second detector means receiving the second radiation pattern and producing a second output signal having a second waveform substantially identical to the first waveform, the first and second waveforms occupying a first relative position when the lens means focuses radiation from the scene at a first position, occupying a second relative position on one side of the first relative position when the lens means focuses radiation from the scene at a second position and occupying a third relative position on a side of the first relative position opposite the one side when the lens means focuses radiation from the scene at a third position, the improvement comprising:

receiving means connected to the first and second detector means to receive the first and second waveforms and to produce a first resultant signal which is a function of the slope of a portion of at least one of the first and second waveforms and to produce a second resultant signal which is a function of the difference in magnitude between the first and second waveforms; and further means connected to said receiving means to receive the first and second resultant signals and to produce a third resultant signal indicative of a function of the product of the first and second resultant signals, the third resultant signal normally being substantially zero when the first and second waveforms occupy the first relative position, having a first sign when the first and second waveforms occupy the second relative position and having a sign opposite the first sign when the first and second waveforms occupy the third relative position.

9. Apparatus according to claim 8 wherein the first waveform has a first position, $a_n$, and a second position, $a_{n+1}$, adjacent to the first position, wherein the second waveform has a first position, $b_n$, and a second position $b_{n+1}$ adjacent to the first position, wherein the first resultant signal is a function of $a_n - a_{n+1}$ and wherein the second resultant signal is a function of $a_n - b_n$.

10. Apparatus according to claim 8 wherein the first waveform has a first position, $a_n$, and a second position, $a_{n+1}$, adjacent to the first position, wherein the second waveform has a first position, $b_n$, and a second position $b_{n+1}$ adjacent to the first position, wherein the first resultant signal is a function of $a_n - a_{n+1} + b_n - b_{n+1}$ and wherein the second resultant signal is a function of $a_n - b_n + a_{n+1} - b_{n+1}$.

11. Apparatus according to claim 8 including summing means connected to said further means to receive the third signal and to produce a fourth signal indicative of the sum of the third signal over a predetermined time period.

12. Apparatus of the class described comprising, in combination:
a first plurality of m radiation detectors $a_1, a_2, a_3 \ldots a_m$ mounted in a first array with each detector operable to produce an output of magnitude indicative of the radiation received thereby, a graph of the individual outputs of the radiation detectors of the first array forming a first curve;
a second plurality of m radiation detectors $b_1, b_2, b_3 \ldots b_m$ mounted in a second array with each detector operable to produce an output of magnitude indicative of the radiation received thereby, a graph of the individual outputs of the radiation detectors of the second array forming a second curve substantially identical to the first curve;
moveable radiation transmission means for directing radiation from an object to the first and second arrays respectively, when said moveable radiation transmission means is in a first position the first and second curves occupy a first relative position with the detectors having corresponding subscripts of the first and second arrays being substantially equal, when said moveable radiation transmission means moves in a first or opposite direction from the first position the first and second curves change in a first or opposite direction from the first relative position and individual outputs of the detectors in at least one of the first and second arrays change in magnitude;
analyzing means connected to said first and second arrays to receive the outputs of the radiation detectors and to produce a first resultant signal which is a function of the slope of at least one of the first and second curves, and second resultant signal indicative of the difference in magnitude of at least one detector from the first array and a detector with a corresponding subscript from the second array; and further means connected to said analyzing means to receive the first and second resultant signal and produce a product output signal indicative of the product of the first and second resultant signal and having a first characteristic when the moveable radiation transmission means is in the first direction from the first relative position and having a second characteristic when the moveable radiation transmission means is in the opposite direction from the first relative position.

13. Apparatus according to claim 12 wherein the first resultant signal is indicative of $a_n - a_{n+1}$ and the second resultant signal is indicative of $a_n - b_n$ where n represents one of the subscripts.

14. Apparatus according to claim 12 wherein the first resultant signal is indicative of $a_n - a_{n+1} + b_n - b_{n+1}$ and the second resultant signal is indicative of $a_n - b_{n+1} + a_{n+1} - b_{n+1}$ where n represents one of the subscripts.

15. Apparatus according to claim 13 further including summing means connected to said further means to receive the product output signal and to produce a sum signal indicative of $$\sum_{1}^{m-1} (a_n - a_{n+1}) \cdot (a_n - b_n)$$

16. Apparatus according to claim 14 further including summing means connected to said further means to receive the product output signal and to produce a sum signal indicative of $$\sum_{1}^{m-1} (a_n - a_{n+1} + b_n - b_{n+1}) \cdot (a_n - b_n + a_{n+1} - b_{n+1})$$

17. Apparatus according to claim 15 further including motive means connected to said summing means and operable in accordance with the sign sum signal to move said moveable radiation transmission means toward the first position.

18. Apparatus according to claim 16 further including motive means connected to said summing means and operable in accordance with the sign sum signal to move said moveable radiation transmission means toward the first position.

19. Apparatus according to claim 1 including indicator means connected to said further means and receiving the product signal to indicate the direction said lens means should be moved to provide a proper focus position.

20. Apparatus according to claim 12 including indicator means connected to said further means and receiving the product output signal to indicate the sign of the product output signal.

21. Apparatus according to claim 12 including motive means connected to said further means and to said radiation transmission means and operable to move said radiation transmission means in accordance with the characteristic of the product output signal.

22. Apparatus for use with a focus determination system which includes lens means having at least a portion which is moveable to a proper focus position, the lens means being operable to produce first and second radiation patterns of a scene, a first plurality of radiation detectors formed in a first array and located so that at least a part of the first of the radiation patterns is received thereby and a second plurality of radiation detectors formed in a second array and located so that at least a part of the second of the radiation patterns is received thereby, each detector in the first and second arrays being operable to produce an output signal of magnitude indicative of the radiation received thereby, the output signals of the first plurality of radiation detectors representing relatively small areas on the first radiation pattern and the output signals of the second plurality of radiation detectors representing relatively small areas on the second radiation pattern, the first and second radiation patterns being similar and in a first relative position when the lens means is at the proper focus position, the first and second radiation patterns moving away from the first relative position in a first manner as the lens means moves in a first direction away from the proper focus position, the first and second radiation patterns moving away from the first relative position in a second manner distinguishable from the first manner as the lens means moves in a second direction away from the proper focus position, the improvement comprising:

signal responsive means connected to receive the output signals of a first and second detector in the first array, and the output signals of at least a first detector in the second array, to compare these output signals and to produce first and second resultant signals therefrom, the first resultant signal including a comparison of the output signal from the first detector in the first array with the output signal from the first detector in the second array, the second resultant signal including a comparison of the output signal from the second detector in the first array with an output signal from a selected one of the detectors in the first and second arrays; and means connected to said signal responsive means to receive the first and second resultant signals and operable in accordance with a comparison of the first and second resultant signals to produce an indication signal having a first characteristic when the first and second radiation patterns have moved away from the first relative position in the first manner and having a second characteristic when the first and second radiation patterns have moved away from the first relative position in the second manner, the characteristic being indicative of the direction the lens means should move to occupy the proper focus position.

23. Apparatus according to claim 22 wherein the first resultant signal varies with the difference between the output signal from a detector in the first array and the output signal from a detector in the second array.

24. Apparatus according to claim 23 wherein the first and second characteristics are magnitudes on opposite sides of a reference magnitude.

25. Apparatus according to claim 22 wherein said signal responsive means also receives other output signals of detectors in the first and second arrays in addition to the first and second detectors in the first and second arrays, said signal responsive means compares the other output signals to produce other resultant signals in addition to the first and second resultant signals and the indication signal represent a composite of comparisons of the first, second and other resultant signals.

* * * * *